Patented Mar. 31, 1953

2,633,467

UNITED STATES PATENT OFFICE 2,633,467

N-HYDROXYALKYL-2-KETOPIPERAZINES

Peter L. de Benneville, Philadelphia, Pa., assignor to Rohm & Haas Company, Philadelphia, Pa., a corporation of Delaware No Drawing. Application February 8, 1952, Serial No. 270,770

3 Claims. (Cl. 260—268)

This invention relates to new 4-hydroxyalkyl-2-ketopiperazines and to a method for their preparation.

It has been found that ketopiperazines of the formula

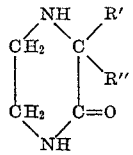

wherein R' and R'' represent hydrogen or alkyl groups of one to four carbon atoms, react with alkylene oxides to form compounds of the formula

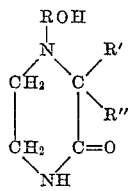

wherein R is an alkylene group and R' and R'' have the significance stated above.

These products are of interest because they contain a reactive amido linkage and an alcoholic hydroxyl group in addition to a tertiary amine group. They are of value in the preparation and modification of resins. They provide compounds having therapeutic action. Some of the new compounds have fungicidal and pesticidal properties.

As a ketopiperazine there may be used a compound such as 2-ketopiperazine, 3-methyl-2-ketopiperazine, 3,3-dimethyl-2-ketopiperazine, 3-ethyl-2-ketopiperazine, 3-ethyl-3-methyl-2-ketopiperazine, 3-propyl-2-ketopiperazine, 3-butyl-2-ketopiperazine, and the like.

As alkylene oxides, ethylene oxide and propylene oxide are of primary importance. Other oxirane compounds can, however, be used, particularly styrene oxide, butadiene monoxide, butylene oxide, and so on. In these compounds there is an alkylene chain of two carbon atoms attached to oxygen. The chain appears between oxygen and nitrogen in the 4-hydroxyalkyl-2-ketopiperazines which are formed.

The reaction between a 2-ketopiperazine and an alkylene oxide is carried out by bringing these two materials together at a temperature between 25° and 80° C., preferably in the presence of a solvent such as water or a lower aliphatic monohydric alcohol. In general it is best to add the alkylene oxide to the ketopiperazine under controlled conditions, cooling being supplied as needed. An approximately molar amount of alkylene oxide is desired per mole of ketopiperazine. The reaction mixture may be stirred and heated to complete the reaction. The products can usually be isolated through distillation or crystallization.

The following examples illustrate this invention and supply additional details of procedure. Parts are by weight.

Example 1

A solution of 57 parts of 3-methyl-2-ketopiperazine, 35 parts of ethylene oxide, and 100 parts of water was carefully heated to 50° C. and maintained at this temperature by cooling. When cooling was no longer needed, the mixture was heated at 50°–60° C. for an hour. The reaction mixture was stripped under reduced pressure and distilled. At 185°–205° C./1.5 mm. there was taken a fraction of 34 parts which corresponded in composition to 3-methyl-4-β-hydroxyethyl-2-ketopiperazine. The distillate contained by analysis 17.3% of nitrogen (theory 17.7%).

Example 2

To a solution of 25.6 parts of 3,3-dimethyl-2-ketopiperazine in 50 parts of water there was gradually added ethylene oxide to an amount of 8.8 parts. The reaction was initiated by heating to 40° C. The temperature was allowed to rise to about 50° C. and was held at this level by cooling. Another six parts of ethylene oxide was run in. When the temperature fell, the reaction mixture was distilled. At 210°–240° C./22 mm. a fraction of 27 parts of a thick yellow oil was obtained. This solidified when cool. The solid was recrystallized from isopropanol and ethyl acetate. The product then melted at 105°–108° C. It corresponded in composition to 3,3-dimethyl-4-β-hydroxyethyl-2-ketopiperazine. It contained by analysis 16.2% of nitrogen (theory 16.3%).

Example 3

To a solution of 25.6 parts of 2-ketopiperazine in 50 parts of water there were added 15 parts of propylene oxide. The solution was maintained for an hour at 50° C. and the condenser was kept cold with ice water. When the reaction was completed, the reaction mixture was distilled to yield 22 parts of a thick yellow oil distilling at 195°–220° C./8 mm. Analysis indicated this product to be 4-β-hydroxyethyl-2-ketopiperazine.

I claim:
1. As new chemical substances, compounds of the formula

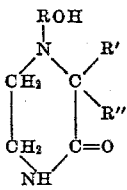

wherein R is an alkylene group having a chain of two carbon atoms between oxygen and nitrogen and R' and R" represent members of the class consisting of hydrogen and alkyl groups of one to four carbon atoms.

2. As a new chemical compound, 3-methyl-4-β-hydroxyethyl-2-ketopiperazine.

3. As a new chemical compound, 3,3-dimethyl-4-β-hydroxyethyl-2-ketopiperazine.

PETER L. DE BENNEVILLE.

REFERENCES CITED

The following references are of record in the file of this patent:

Aspinall: J. Am. Chem. Soc., 62, pp. 1202–1204 (1940).

Kitchen et al.: J. Org. Chem., 8, 337–340 (1942).